United States Patent
Bottomley et al.

[19]

[11] Patent Number: 6,005,887
[45] Date of Patent: Dec. 21, 1999

[54] DESPREADING OF DIRECT SEQUENCE SPREAD SPECTRUM COMMUNICATIONS SIGNALS

[75] Inventors: Gregory E. Bottomley; Rajaram Ramesh, both of Cary; Paul W. Dent, Pittsboro; Sandeep Chennakeshu, Cary, all of N.C.

[73] Assignee: Ericcsson, Inc., Research Triangle Park, N.C.

[21] Appl. No.: 08/748,755

[22] Filed: Nov. 14, 1996

[51] Int. Cl.$^6$ .............................. H04B 15/00; H04K 1/00; H04L 27/30
[52] U.S. Cl. .......................... 375/207; 375/206; 375/343; 364/728.03
[58] Field of Search ...................................... 375/200, 206, 375/208, 343, 207, 216, 346; 364/728.03, 728.04, 728.05

[56] References Cited

U.S. PATENT DOCUMENTS

| | | | |
|---|---|---|---|
| 4,561,089 | 12/1985 | Rouse et al. | 375/200 |
| 4,567,588 | 1/1986 | Jerrim | 375/200 |
| 4,601,047 | 7/1986 | Horwitz et al. | 375/200 |
| 4,644,523 | 2/1987 | Horwitz | 375/200 |
| 5,610,940 | 3/1997 | Durrant et al. | 375/208 |
| 5,659,574 | 8/1997 | Durrant et al. | 375/206 |
| 5,710,793 | 1/1998 | Greenburg | 375/232 |
| 5,754,585 | 5/1998 | Durrant et al. | 375/206 |
| 5,757,854 | 5/1998 | Hunsinger et al. | 375/260 |
| 5,768,306 | 6/1998 | Sawahashi et al. | 375/206 |

*Primary Examiner*—Chi H. Pham
*Assistant Examiner*—Bryan Webster
*Attorney, Agent, or Firm*—Jenkens & Gilchrist

[57] ABSTRACT

The disclosure presents a number of reduced complexity architectures for despreading direct sequence spread spectrum communications signals. In a first despreading architecture for a sequence removal unit, received chip-spaced complex samples are negated in accordance with the processed phase of a complex spreading sequence. Furthermore, the in-phase and quadrature phase sample values are switched for each other in accordance with the processed phase. In a second despreading architecture, in a sequence removal unit, received chip-spaced complex samples are processed in the logarithmic domain, with the phase of the complex spreading sequence added to the detected phase, and the resulting complex signal then converted back to Cartesian coordinates. In a third despreading architecture for a correlator, sequence removal and correlation are performed in the logarithmic domain with the amplitudes and phases for the resulting complex signal arithmetically averaged and then converted back to Cartesian coordinates. architecture also for a correlator, sequence removal and correlation are performed in the logarithmic domain using circular averaging. In a fifth despreading architecture also for a correlator, wherein multiple component sequences are combined together to form an overall sequence, and wherein one of the multiple component sequences is shared by all channels, a common sequence removal is provided for removal of the shared sequence from all channels. The resulting signals are then sent to a plurality of individual correlators for removal of channel specific sequences.

39 Claims, 5 Drawing Sheets

DESPREADING OF DIRECT SEQUENCE SPREAD SPECTRUM COMMUNICATIONS SIGNALS

BACKGROUND OF THE INVENTION

1. Technical Field of the Invention

The present invention relates to spread spectrum communications systems and, in particular, to the despreading of direct sequence spread spectrum communications signals.

2. Description of Related Art

The cellular telephone industry has made phenomenal strides in commercial operations in the United States as well as the rest of the world. Growth in major metropolitan areas has far exceeded expectations and is outstripping system capacity. If this trend continues, the effects of rapid growth will soon reach even the smallest markets. The predominant problem with respect to continued growth is that the customer base is expanding while the amount of electromagnetic spectrum allocated to cellular service providers remains fixed. Innovative solutions are required to meet these increasing capacity needs as well as to maintain high quality service and avoid rising prices.

Currently, channel access is primarily achieved using Frequency Division Multiple Access (FDMA) and Time Division Multiple Access (TDMA) methods. In frequency division multiple access systems, a communication channel is a single radio frequency band into which the transmission power of a signal is concentrated. In time division multiple access systems, a channel comprises a time slot in a periodic train of time intervals over the same radio frequency.

Spread spectrum comprises a communications technique that is finding commercial application in wireless communications. Spread spectrum systems have been around since the days of World War II. Early applications were predominantly military oriented (relating to smart jamming and radar). However, there is an increasing interest today in using spread spectrum systems in commercial applications, including digital cellular radio, land mobile radio, and indoor and outdoor personal communication networks.

In a spread spectrum transmitter, a digital bit stream at a basic data rate is spread to a transmit data rate (or chip rate). This spreading operation involves applying a user unique digital code (the spreading or signature sequence) to the bit stream that increases its data rate while adding redundancy. This application typically multiplies (or logically XOR's) the digital bit stream by the digital code. The resulting transmitted data sequences (chips) are then modulated using a form of quadrature phase shift keying (QPSK) to generate an output signal. This output signal is added to other similarly processed output signals for multi-channel transmission over a communications medium. The output signals of multiple users (channels) advantageously share one transmission communications frequency, with the multiple signals appearing to be located on top of each other in both the frequency domain and the time domain. Because the applied digital codes are user unique, however, each output signal transmitted over the shared communications frequency is similarly unique, and through the application of proper processing techniques at the receiver may be distinguished from each other. In the spread spectrum receiver, the received signals are demodulated and the appropriate digital code for the user of interest is applied (i.e., multiplied) to despread, or remove the coding from the desired transmitted signal and return to the basic data rate. Where this digital code is applied to other transmitted and received signals, however, there is no despreading as the signals maintain their chip rate. The despreading operation thus effectively comprises a correlation process comparing the received signal with the appropriate digital code.

In many spread spectrum communication systems, the transmitted data sequences include two components: an in-phase (I) component and a quadrature phase (Q) component. These components are typically viewed as the real and imaginary parts of a complex signal. In the spread spectrum transmitter, a complex spreading sequence is applied, and the two components are modulated (in accordance with the quadrature phase shift keying processing) and combined to form the generated output signal for transmission. Because the received signal now similarly includes both an in-phase component and a quadrature phase component, the despreading operation performed by the spread spectrum receiver must correlate the received complex signal to the appropriate digital code (signature sequence). This is typically accomplished using two scalar correlators, one fed with in-phase samples and one fed with quadrature phase samples. If a complex spreading sequence is used, however, four scalar correlators are needed further increasing the complexity of the correlation process.

The signals transmitted between two places in mobile communication systems may suffer from echo distortion or time dispersion. Multipath dispersion occurs when a signal proceeds to the receiver along not one, but many paths, so that the receiver receives many echoes having different and randomly varying delays and amplitudes. This is typically caused by, for example, signal reflections from large buildings or nearby mountain ranges. When multipath time dispersion is present in a spread spectrum communications system, the received signal comprises a composite of multiple versions (or images) of the transmitted signal that have propagated along different paths (referred to as "rays"). These versions of the transmitted signal typically have relative time delays with respect to each other of less than one symbol period. In certain situations, like macro-diversity and soft handoff, the delays may be greater.

The presence of multipath time dispersion with respect to a complex transmitted spread spectrum signal significantly complicates the receiving and correlating processes. A RAKE receiver, so named because it rakes the multipath contributions together using a weighted sum, is then used to receive the multiple rays of the signal. One correlation device (comprising an in-phase correlation section and a quadrature phase correlation section) is provided for each image of the transmitted signal. Each correlation device is aligned with its corresponding signal image (ray) through the use of a delay line. The received time diverse signals at each correlation device are then weighted in proportion to their received signal amplitudes, and the resulting signals summed (in-phase and quadrature phase) for output and further processing.

It is further noted that in some systems the overall spreading sequence may in fact comprise a combination of multiple sequences. For example, in the digital cellular standard TIA IS-95 for code division multiple access (CDMA) spread spectrum communications, downlink information is spread by using a real signature sequence. The information is further scrambled with in-phase and quadrature phase scrambling sequences. Thus, the overall spreading sequence is complex, resulting from a composite of a complex scrambling sequence on top of a real spreading sequence. At the receiver, complex correlations are needed to process the signal giving rise to a high degree of complexity when using conventional techniques. The complexity is further increased when multiple channels (for example, traffic and pilot) need to be simultaneously despread.

There is a need then for reduced complexity correlation architectures for processing complex spread spectrum communications signals subject to multipath time dispersion, composite spreading and multi-channel reception.

SUMMARY OF THE INVENTION

The present invention comprises a number of reduced complexity architectures useful for despreading direct sequence spread spectrum communications signals. The correlator for receiving and processing transmitted direct sequence spread spectrum communications signals generally includes a complex sequence removal unit and an accumulation and dump unit.

In a first despreading architecture for a complex sequence removal unit, chip-spaced complex samples are received and effectively multiplied by a phase rotated complex despreading sequence. A complex negation unit receives the chip-spaced complex samples and performs a first part of the multiplication by selectively negating the samples based on the complex despreading sequence. The complex sequence removal unit further includes a complex switch which performs a second part of the multiplication by selectively exchanging the selectively negated in-phase and quadrature phase sample values based on the complex despreading sequence.

In a second despreading architecture for a complex sequence removal unit, the chip-spaced complex samples are represented in the logarithmic domain, in which a first number represents the log of the signal amplitude and a second number represents signal phase in a modulo $2\pi$ domain. A phase related to the appropriate complex despreading sequence is added to the detected phase of the chip-spaced complex samples. The resulting complex signal including the phase adjustment may then be converted, if desired, from the log-polar domain to the Cartesian domain.

In a third despreading architecture for a CDMA correlator, the complex sequence removal unit processes the chip-spaced complex samples in the log-polar domain. The logarithmic amplitude of the chip-spaced complex samples is determined and arithmetically averaged. The phases of the chip-spaced complex samples are combined with phases related to the appropriate complex despreading sequence to obtain resulting de-spread phases. The resulting complex signal including the arithmetically averaged amplitudes and phases in the log-polar domain is then converted back to Cartesian coordinates for further processing.

In a fourth despreading architecture also for a CDMA correlator, the complex sequence removal unit processes the chip-spaced complex samples in the log-polar domain. The logarithmic amplitude of the chip-spaced complex samples is determined. The phases of the chip-spaced complex samples are combined with phases related to the appropriate complex despreading sequence to obtain resulting de-spread phases. Circular averaging of these phases is performed. The resulting complex signal including the averaged amplitudes and phases in the log-polar domain is then converted back to Cartesian coordinates for further processing.

In a fifth despreading architecture also for a CDMA correlator, an overall sequence used in the transmission of a spread spectrum communication comprises a plurality of component sequences, wherein one of the multiple component sequences is shared by all channels. A common descrambler is provided in the receiver for removal of the shared sequence from all channels. The resulting signals are then sent to a plurality of individual correlators for removal of channel specific sequences.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
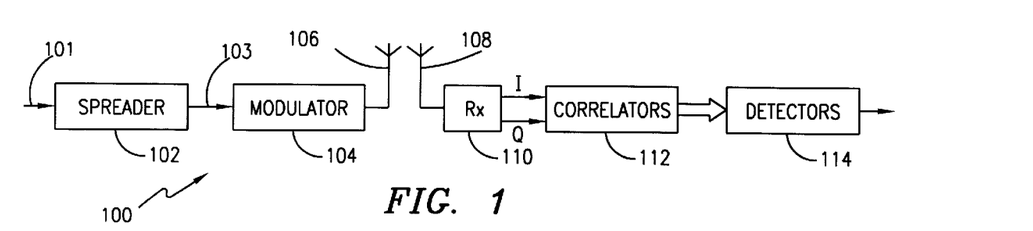
FIG. 1 is a block diagram of a spread spectrum communications system.

Reference is now made to FIG. 1 wherein there is shown a block diagram of a direct sequence spread spectrum communications system 100. An informational data stream is received on line 101. A spreader 102 then impresses a much higher rate data stream known as a signature (or spreading) sequence onto the received informational data stream to generate on line 103 a spread or transmitted data sequence of "chips". This combination of the higher rate spreading sequence with the lower rate informational data stream is often also referred to as spreading or coding. Spreading of the informational data stream may be accomplished by performing exclusive-OR operations to logically combine the informational data stream and the spreading sequence (equivalent to arithmetic multiplication if bits are assigned values of plus or minus 1). Other forms of spreading are known. For example, a set of M bits is spread by using the bits to select one of set of N code words, where $N=2^M$. The set of code words could be an orthogonal set, such as the Walsh or Hadamard code word sets. Although not shown, the spreader 102 may effectuate multiple spreading and scrambling processes, some common to (or shared by) all transmitted channels, before outputting the spread data sequence on line 103.

The spread data sequence is then modulated onto a radio-frequency carrier by modulator 104. If the symbols of the spread data sequence are binary, then binary phase shift keying (BPSK) is effectuated by the modulator 104. If the symbols of the spread data sequence are complex, however, then quadrature phase shift keying (QPSK) or offset-QPSK is effectuated by the modulator 104. The modulated spread data sequence is then passed to broadcast antenna 106 for transmission using electromagnetic waves.

A receive antenna 108 collects the signal energy of the transmitted modulated spread data sequence and passes that energy to a radio receiver 110. The receiver 110 amplifies, filters, mixes, and analog-to-digital converts as necessary to convert the received radio signal to a complex, baseband signal having both an in-phase (I) component and a quadrature phase (Q) component. These components are usually sampled at least once per chip period and may or may not be stored in a buffer memory (not shown).

The complex baseband signals are passed to one or more correlators 112, which correlate the data samples to the known spreading sequence. This is sometimes referred to as despreading since the correlation coherently combines the multiple spread data values back into a single informational value when the despreading sequence is correctly time-aligned with the received sample sequence. The output correlations are provided to one or more detectors 114 which reproduce the original informational data stream. The form of detector used depends on the characteristics of the radio channel and complexity limitations. It may include channel estimation and coherent RAKE combining, or differential detection and combining, as necessary.

Figure 2:
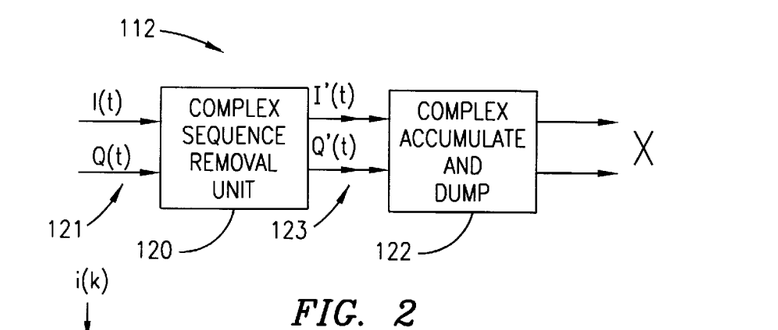
FIG. 2 is a block diagram of a despreading correlator used in the spread spectrum communications system of FIG. 1.

Reference is now made to FIG. 2 wherein there is shown a block diagram of the correlator 112 used in the spread spectrum communications system 100 of FIG. 1. Complex chip samples for the complex baseband signal output are provided to complex sequence removal unit 120 over lines 121. The complex sequence removal unit 120 multiplies these chip samples by the conjugate of an element in the appropriate complex spreading sequence (s(k)) comprising the despreading sequence. The resulting chip samples are output to a complex accumulate and dump unit 122 over lines 123. The complex accumulate and dump unit 122 collects and then outputs correlation values (denoted X) once per symbol period.

Figure 3:
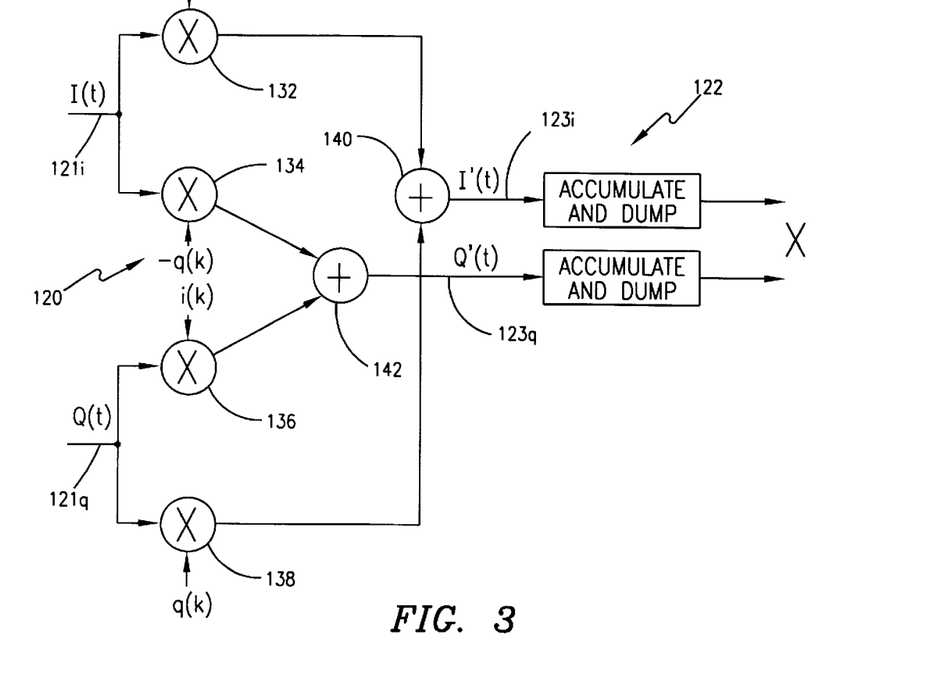
FIG. 3 is a more detailed block diagram of the despreading correlator illustrated in FIG. 2 and used in the spread spectrum communications system of FIG. 1.

Reference is now made to FIG. 3 wherein there is shown a more detailed block diagram of the correlator 112 illustrated in FIG. 2 and used in the spread spectrum communications system 100 of FIG. 1. Chip spaced samples of the in-phase component (denoted I(t)) of the complex baseband signal received by the complex sequence removal unit 120 on line 121$i$ are provided to both multipliers 132 and 134. Multiplier 132 is fed with the in-phase component (denoted i(k)) of the spreading sequence, and multiplier 134 is fed with the negative of quadrature phase component (denoted −q(k)) of the spreading sequence. Similarly, the hip spaced samples of the quadrature phase component (denoted Q(t)) of the complex baseband signal received by the complex sequence removal unit 120 on line 121$q$ are provided to both multipliers 136 and 138. Multiplier 136 is fed with the in-phase component (denoted i(k)) of the spreading sequence, and multiplier 138 is fed with the quadrature phase component (denoted q(k)) of the spreading sequence. Because the spreading sequences i(k) and q(k) are typically plus one or minus one in value, multipliers 132, 134, 136 and 138 can be implemented as programmable invertors, either passing the received sample value or its negative depending on the value of i(k) and q(k).

The outputs of multipliers 132 and 138 are summed by adder 140 and output from the complex sequence removal unit 120 as an in-phase resulting chip sample signal (denoted I'(t)) on line 123$i$. The output in-phase signals are then accumulated in complex accumulate and dump unit 122. Similarly, the outputs of multipliers 134 and 136 are summed by adder 142 and output from the complex sequence removal unit 120 as a quadrature phase resulting chip sample signal (denoted Q'(t)) on line 123$q$. The output quadrature phase signals are then accumulated in complex accumulate and dump unit 122. The complex accumulate and dump unit 122 is dumped and reset once a symbol period providing both the real and imaginary parts of the correlation values (denoted X). It should be noted that in instances where the complex accumulate and dump unit 122 is run at twice the rate of the multipliers 132, 134, 136 and 138, then adders 140 and 142 are not needed.

The correlator 112 accordingly performs two operations. The first operation comprises the functionality performed by the complex sequence removal unit 120. The second operation comprises the functionality performed by the complex accumulate and dump unit 122. The present invention addresses reducing the complexity of both the first and second operations.

Figure 4:
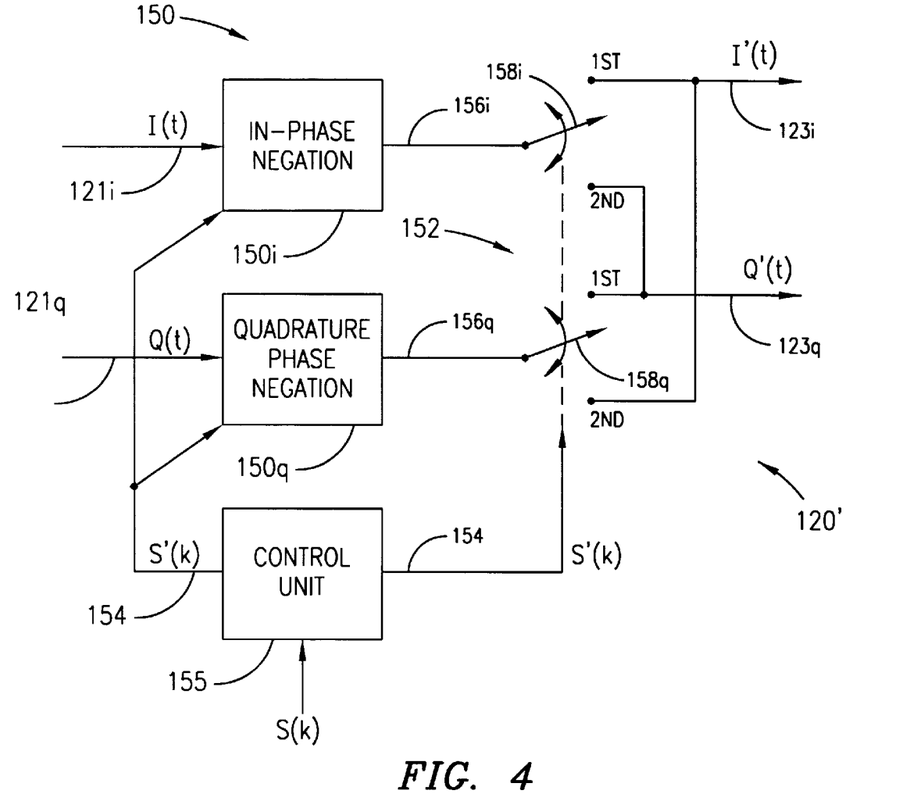
FIG. 4 is a block diagram of a first embodiment for an improved complex sequence removal unit of the present invention.
Figure 5A:
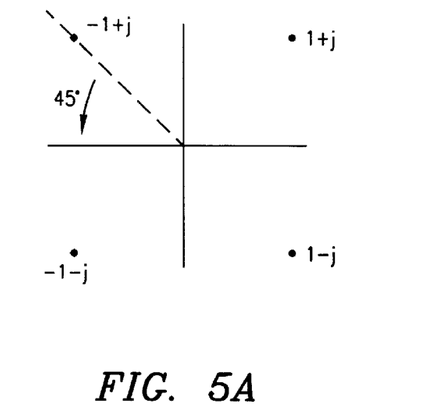
FIGS. 5A and 5B illustrate the possible values for the components of a complex spreading sequence.
Figure 5B:
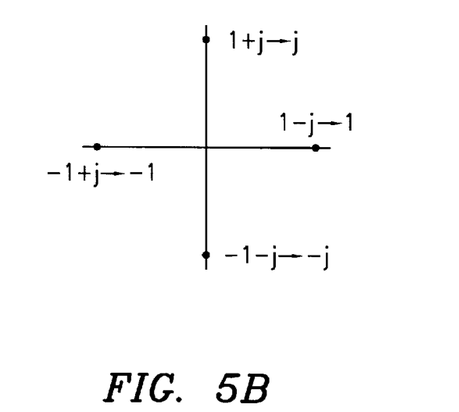

Reference is now made to FIG. 4 wherein there is shown a block diagram of a first embodiment for an improved complex sequence removal unit 120' of the present invention. The complex spreading (or scrambling) sequence may be written as:

$$s(k)=i(k)+jq(k) \tag{1}$$

wherein i(k) is the in-phase component of the spreading sequence, and q(k) is the quadrature phase component of the spreading sequence. Both i(k) and q(k) are either plus one or minus one in value. Accordingly, there are four possible values for the complex spreading sequence s(k) positioned as shown in FIG. 5A. By rotating these values by forty-five degrees and dividing by the square root of two, as shown in FIG. 5B, the four possible values for the rotated complex spreading sequence s'(k) become plus one, minus one, plus j and minus j. The improved complex sequence removal unit 120' of the correlator 112 advantageously uses this relationship to simplify the complex sequence removal process by exploiting the fact that the rotated sequence has either a zero imaginary part or a zero real part. It should be noted that rotation by forty-five degrees is not the only possible rotation, and that the present invention is intended to incorporate all other advantageous rotations, such as rotation by one hundred thirty-five degrees, two hundred twenty-five degrees or three-hundred fifteen degrees.

The complex sequence removal process essentially comprises the multiplication of the received complex baseband signal by a despreading sequence comprising the conjugate of the complex spreading sequence. In the improved complex sequence removal unit 120', a negation unit 150 performs part of the multiplication of the received complex baseband signal by the rotated complex despreading sequence by selectively negating or not negating a received complex baseband signal value. An in-phase negation unit 150$i$ connected to line 121$i$ to receive chip spaced samples of the in-phase component (denoted I(t)) of the complex baseband signal. A corresponding quadrature phase negation unit 150$q$ is connected to line 121$i$ to receive chip spaced samples of the quadrature phase component (denoted Q(t)) of the complex baseband signal.

The improved complex sequence removal unit 120' further includes a switch 152 for performing the rest of the multiplication of the received complex baseband signal by the rotated complex spreading sequence by selectively exchanging or not exchanging the corresponding in-phase and quadrature phase samples of the received complex baseband signal value. The switch 152 comprises a first switching element 158$i$ connected to in-phase line 156$i$ and controllable to be selectively switched to make a first position connection between in-phase line 156$i$ and line 123$i$ which outputs the in-phase resulting chip sample signal (denoted I'(t)), and a second position connection between in-phase line 156$i$ and line 123$q$ which outputs the quadrature phase resulting chip sample signal (denoted Q'(t)). A second switching element 158*q* is connected to quadrature phase line 156*q* and is controllable to be selectively switched to make a first position connection between quadrature phase line 156*q* and line 123*q* which outputs the quadrature phase resulting chip sample signal (denoted Q'(t)), and a second position connection between quadrature phase line 156*q* and line 123*i* which outputs the in-phase resulting chip sample signal (denoted I'(t)).

Selective operation of the negation units 150*i* and 150*q* and first and second switching elements 158*i* and 158*q* is controlled by control unit 155. The control unit 155 receives the complex spreading sequence s(k) and outputs first and second control sequence signals on lines 154 to the negation units 150*i* and 150*q* and first and second switching elements 158*i* and 158*q* which in essence effectuates multiplication of the chip spaced samples by the conjugate s"(k) of the forty-five degree rotated values of the rotated complex spreading sequence s'(k). It is noted that it is not actually necessary to compute the rotated complex spreading sequence s'(k) or conjugate s"(k). Rather, included logic within the control unit 155 processes the complex spreading sequence s(k) to control the in-phase negation unit 150*i* via an in-phase first control sequence signal to negate the in-phase component of the complex baseband signal if s(k) is in either −1+j or 1+j form (i.e., the rotated conjugate sequence s"(k) is either −1 or −j). Otherwise, no negation is performed by the in-phase negation unit 150*i* (i.e., the sequence s"(k) is either 1 or j). The included logic similarly controls the quadrature phase negation unit 150*q* via a quadrature phase first control sequence signal to negate the quadrature phase component of the complex baseband signal if s(k) is in either −1+j or −1−j form (i.e., the rotated sequence s"(k) is either −1 or j). Otherwise, no negation is performed by the quadrature phase negation unit 150*q* (i.e., the rotated sequence s"(k) is either 1 or −j). With respect to the switch 152, the included logic places both first and second switching elements 158*i* and 158*q* in the first position via the second control sequence signal if s(k) is in either 1−j or −1+j form (i.e., the rotated sequence s"(k) is either 1 or −1) thus connecting in-phase line 156*i* to line 123*i* and connecting quadrature phase line 156*q* to line 123*q*, respectively. Otherwise, both first and second switching elements 158*i* and 158*q* are placed in the second position (i.e., the rotated sequence s"(k) is either j or −j) thus connecting in-phase line 156*i* to quadrature phase line 123*q* and connecting quadrature phase line 156*q* to in-phase line 123*i*, respectively. A practical implementation of a negator can, for example, be to make always available both the negated and the unnegated values, and then to select one of them for output using a two-way selection switch. Such a device can be economically fabricated very small using the technology of CMOS silicon integrated circuits.

Figure 6:
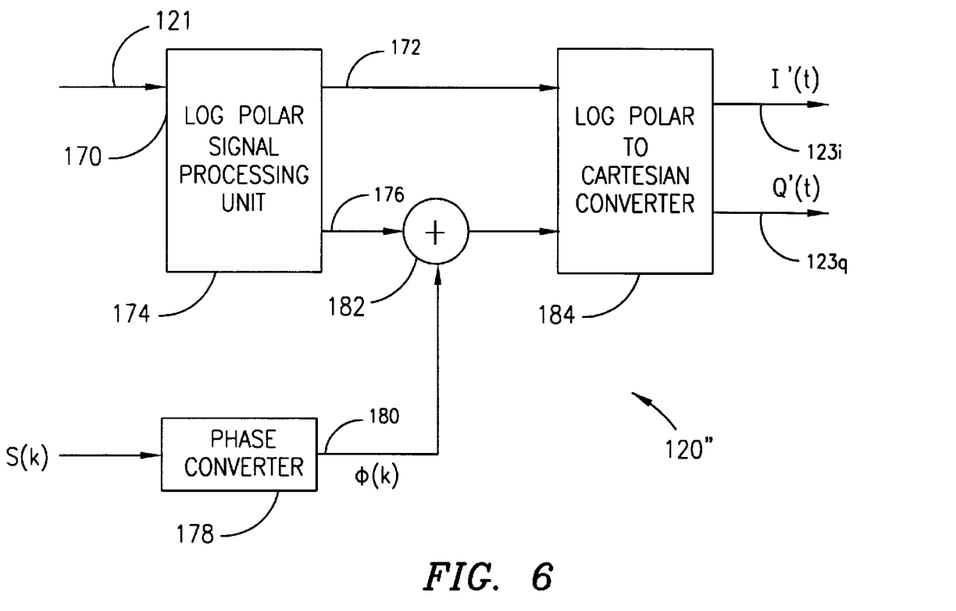
FIG. 6 is a block diagram of a second embodiment for an improved complex sequence removal unit of the present invention.

Reference is now made to FIG. 6 wherein there is shown a block diagram of a second embodiment for an improved complex sequence removal unit 120" of the present invention. A complex number (for example, A+jB) can be expressed in either Cartesian (x,y) form or in polar (R,θ) form. Translation between these two forms can be effected readily with the aid of the equations x=R cos(θ) and y=R sin(θ). The log-polar (r,θ) form, in which r=log(R), is an alternative to the previously mentioned forms. As previously discussed and shown in FIG. 5A, there are four possible values for the complex spreading sequence s(k). As each of these four values in the complex spreading sequence has an amplitude of one, there is no need to account in the signal processing for an amplitude change in the spreading sequence. The phase of the complex spreading sequence, however, does change, causing a modification of the phase values of the received complex baseband signal value. Thus, phase offset values of +45°, +135°, +225°(−135°), and +315°(−45°) are added to the received complex baseband signal value depending on the values of the complex spreading sequence. Similarly, with respect to the phase rotated complex spreading sequence illustrated in FIG. 5B, phase offset values of +0°, +90°, +180°, and +270°(−90°) are added to the received complex baseband signal value. The improved complex sequence removal unit 220" of the correlator 112 advantageously uses the fixed number of phase offset values to simplify the complex sequence removal process.

The complex sequence removal process essentially comprises the multiplication of the received complex baseband signal by the complex spreading sequence. Remembering the log-polar form discussed above, it is noted that in the logarithmic domain multiplication, such as that performed in connection with the complex sequence removal process, becomes addition. Accordingly, in the second embodiment of the improved complex sequence removal unit 120", the received signal is represented in log-polar form and the complex sequence removal process is effectuated through a modulo 2π phase addition or subtraction operation, with the phase part of the log-polar complex baseband signal and phase offsets specified by the complex spreading sequence. The result of this process may then be converted, if desired, back to Cartesian form for output.

The improved complex sequence removal unit 120" accordingly comprises a log-polar signal processing unit 170, implementing the processing disclosed in U.S. Pat. No. 5,048,059, issued Sep. 10, 1991, to Paul W. Dent, and entitled "Log-Polar Signal Processing", which is hereby incorporated by reference. The log-polar signal processing unit 170 is connected to line 121 to receive an RF or IF signal and output on line 172 the logarithm of the amplitude of the received signal. The log-polar signal processing unit 170 further processes the received signal and extracts its phase for output on line 176. The log-polar signal processing unit 170 may include a series of saturating amplifiers, for limiting the signal and providing a log-amplitude waveform. The limited signal is used to determine phase values using any known method including that method disclosed in U.S. Pat. No. 5,148,373, which is hereby incorporated by reference.

The improved complex sequence removal unit 120" still further includes a phase converter 178 connected to receive the complex spreading sequence s(k). The phase converter 178 processes the complex spreading sequence to extract four possible phase offset values (see, FIGS. 5A and 5B) for output as a phase offset signal φ(k) on line 180. Included logic within the phase converter 178 preferably implements a look-up table functionality for generating the values for the phase offset signal φ(k), which corresponds to the phase of the conjugate of s'(k). An adder/subtractor or summer 182 is also provided in the improved complex sequence removal unit 120" to combine the extracted phase of the received complex baseband signal output on line 176 and the phase offset output on line 180 to effectuate a phase shift based on the complex spreading sequence phase, thus removing the phase shift caused by spreading at the transmitter. The inputs to the adder/subtractor or summer 182 are typically integer, fixed point values, allowing for the use of an integer, modulo arithmetic unit which is simple to make and use.

The logarithm of the amplitude of the received signal (line 172) output from the log-polar signal processing unit 170 and the phase shifted values from the adder/subtractor or summer 182 are then processed by a converter 184 which converts the descrambled log-polar values to Cartesian form for in-phase output on line 123*i* (denoted I'(t)) and quadrature phase output on line 123*q* (denoted Q'(t)), provided Cartesian form is desired for subsequent processing.

Figure 7:
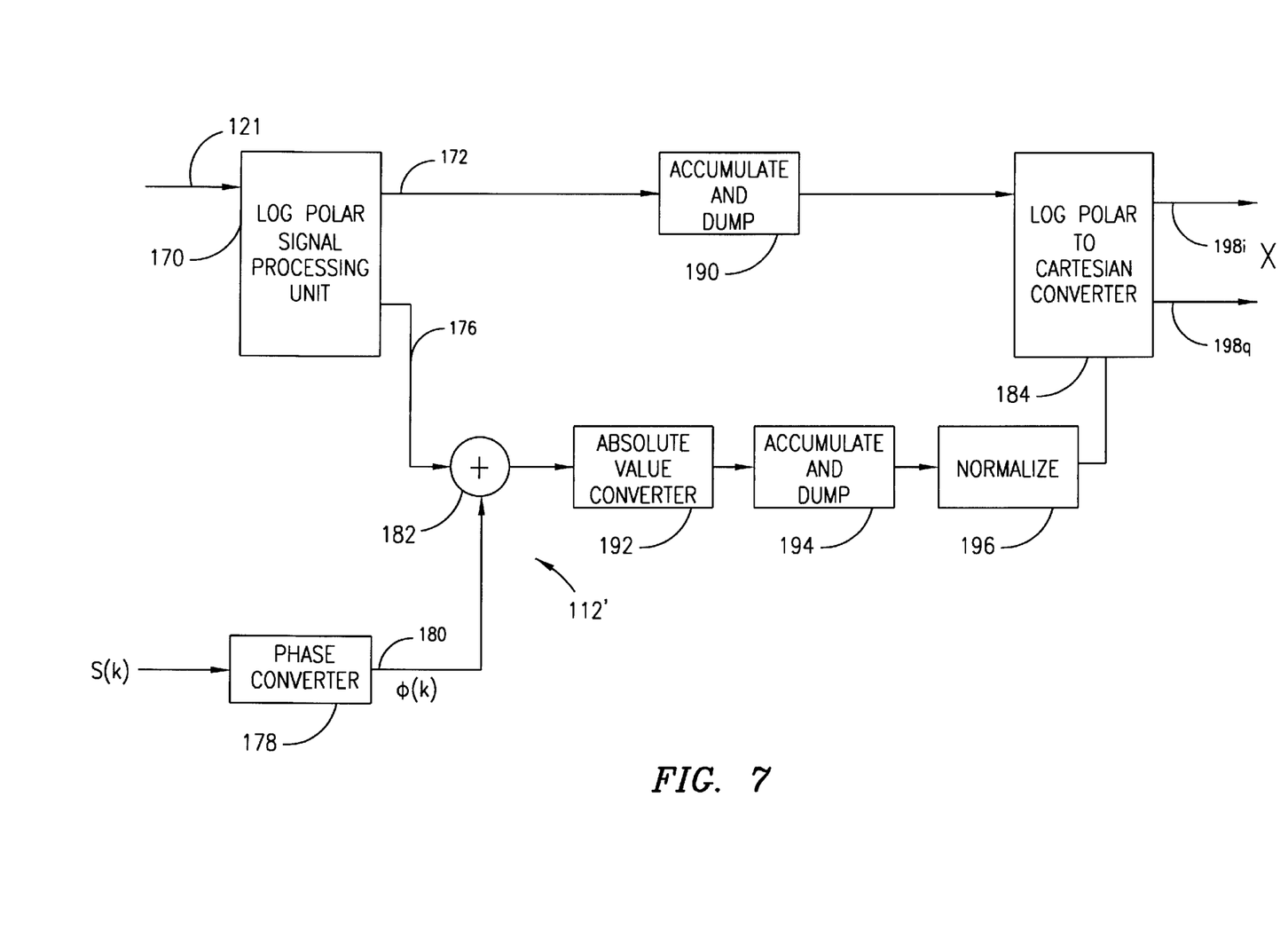
FIG. 7 is a block diagram of a first embodiment for an improved correlator of the present invention.

Reference is now made to FIG. 7 wherein there is shown a block diagram of a first embodiment for an improved correlator 112' of the present invention. The correlator 112 of FIGS. 2 and 3 essentially computes arithmetic averages of the product of the received signal with the complex conjugate of the complex spreading or scrambling sequence, by means of an accumulate and dump circuit. The improved correlator 112' instead bases its operation on the computation of geometric and multiplicative averages. In this connection, it is noted that a multiplicative average comprises an arithmetic average with respect to logarithmic values. Accordingly, in the improved correlator 112', both the logarithm of the amplitude of the received complex baseband signal and its phase (as offset) are used in effectuating the correlation process.

Similar then to FIG. 6, the improved correlator 112' of FIG. 7 includes a log-polar signal processing unit 170 connected to line 121 to an RF or IF signal and output the logarithm of the amplitude of the received complex baseband signal on line 172 and the phase of the received complex baseband signal on line 176. To effectuate the multiplicative averaging functionality referred to above with respect to the amplitude of the received complex baseband signal, the logarithmic amplitudes are output on line 172 from the log-polar signal processing unit 170 to an accumulate and dump unit 190 for addition in the logarithmic domain. The accumulate and dump unit 190 is dumped and reset once a symbol period providing arithmetically averaged logarithmic amplitude values once per symbol period.

The improved correlator 112' still further includes a phase converter 178 connected to receive the complex spreading sequence s(k). The phase converter 178 processes the complex spreading sequence to extract four possible phase offset values (see, FIGS. 5A and 5B) for output as a phase offset signal φ(k) on line 180. A phase adder or summer 182 is provided to sum the detected phase of the received complex baseband signal on line 176 and the phase offset on line 180 to effectuate a phase shift in the complex baseband signal based on the complex spreading sequence phase.

The adding of phase values is not as straightforward a process as the adding of the logarithmic amplitude values because of the wrap-around characteristic of phase (i.e., 0° and 360° are the same). It is noted that after complex sequence removal, phase values near 0° (or 0 radians) imply the transmission of a value of plus one, while phase values near 180° (or π radians) imply the transmission of a value of minus one. To effectuate the multiplicative averaging functionality referred to above with respect to the phase of the received complex baseband signal, the complex spreading sequence shifted phase of the received complex baseband signal output from the phase adder or summer 182 in the logarithmic domain is represented as between −180° and 180° (−π and π radians), or some equivalent form, and processed in an absolute value converter 192 and an accumulate and dump unit 194. The accumulate and dump unit 194 is dumped and reset once a symbol period providing arithmetically averaged, absolute value phase values once per symbol period to a normalization unit 196.

The absolute value converter 192, accumulate and dump unit 194, and normalization unit 196 thus form phase β in accordance with the following equations:

$$\gamma = \sum_{k=0}^{N-1} |\theta(k) + \phi(k)| \quad (2)$$

wherein θ(k) is the detected phase of the received $$\beta = \frac{\gamma}{N} \quad (3)$$

complex baseband signal output on line 176, φ(k) is the phase offset of the conjugate of the complex signature sequence s'(k) output on line 180, and N is the number of values accumulated and over which averaging occurs.

The arithmetically averaged logarithmic amplitude values output from the accumulate and dump unit 190 and the arithmetically averaged phase values output from the normalization unit 196 may then, if desired, be processed by a converter 184 which converts the despread signal from log-polar form to Cartesian form to output the real and imaginary parts of the correlation values (denoted X) on lines 198*i* and 198*q*, respectively. This essentially converts the arithmetic averages of amplitude and phase in the logarithmic domain to a multiplicative or geometric average in the Cartesian domain.

Figure 9:
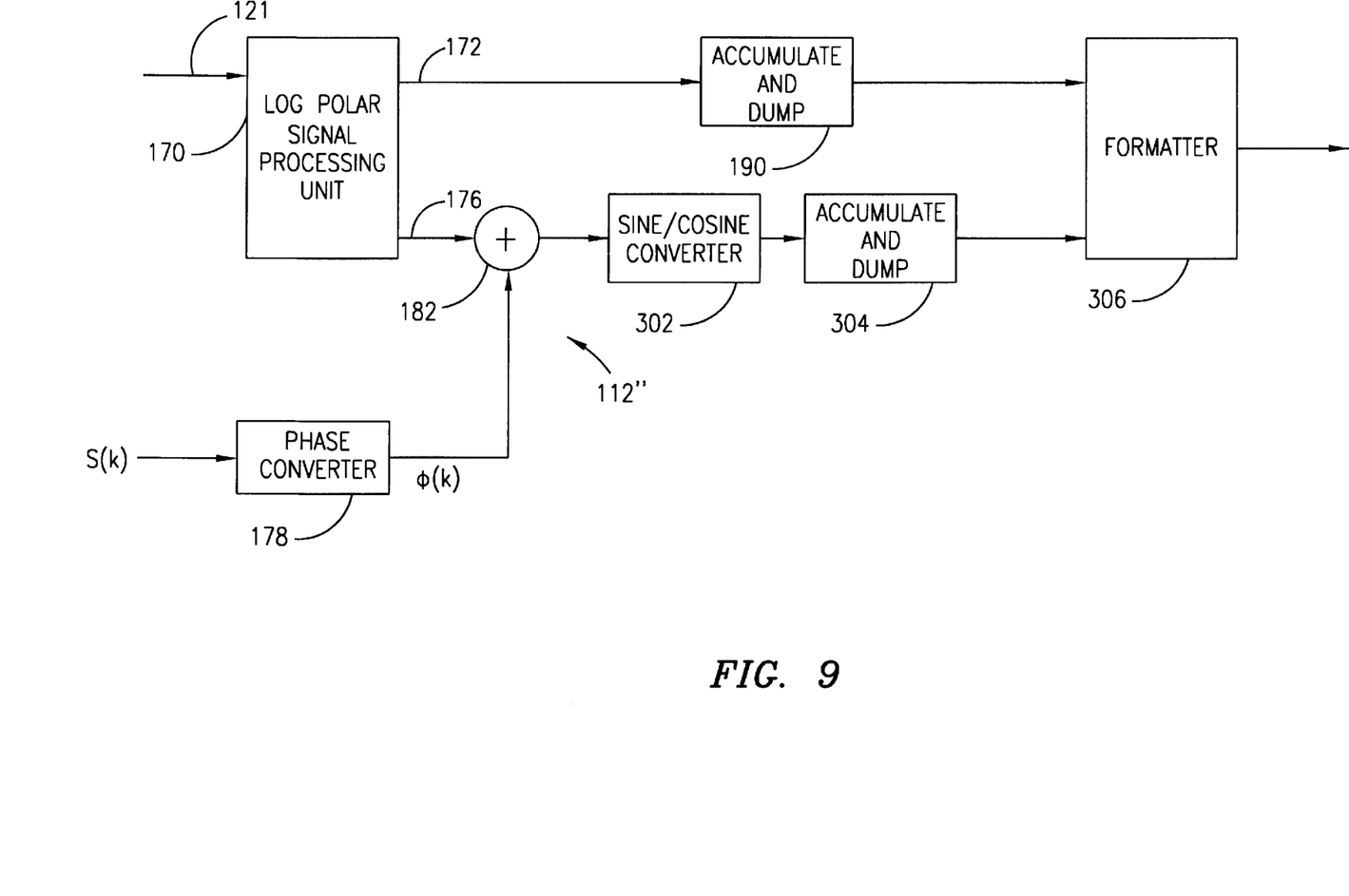
FIG. 9 is a block diagram of another embodiment for an improved correlator of the present invention.

Reference is now made to FIG. 9 wherein there is shown another embodiment of the an improved correlator 112" of the present invention. Like reference numerals refer to corresponding parts as in FIG. 7, and thus a repeat description will not be provided. The outputs of phase adder or summer 182 are averaged through the use of circular averaging which computes an average of the sine of the phase and an average of the cosine of the phase. The output of the phase adder or summer 182 is processed in a sine/cosine converter 302 which produces both sine and cosine values. In accumulate and dump unit 304, the sine and cosine values are accumulated separately over a certain period and then dumped, providing averaged sine and cosine values. The average sine and cosine values, as well as the average log-amplitude values from accumulate and dump unit 190, are provided to formatter 306 which converts these quantities to a form suitable for further processing, such as a Cartesian or log-polar value. For example, conversion to a log-polar value is accomplished by converting the average sine and average cosine to an average angle using an arctangent function. Another possibility is to convert to an average in-phase value and an average quadrature phase value by converting the average log-amplitude value to an average amplitude value and multiplying by the average sine and average cosine values, respectively.

In a code division multiple access (CDMA) type of spread spectrum communications system, the overall spreading sequence or signature sequence may be the result of multiple component sequences combined together. Furthermore, it is known to have multiple channels share one or more of the same common component sequences. For example, in the downlink specified by TIA IS-95, all channels share a common complex scrambling sequence, referred to as the pilot sequence. The channels are then individually spread using different Walsh code words, which are real or non-complex sequences. One of the channels, however, is not data modulated, providing a reference or pure pilot sequence channel for use in obtaining channel tap estimates. In a conventional receiver then, for example with respect to the IS-95 specified signature sequence, separate correlators 112 (see FIGS. 3 and 4) are provided for each channel to be demodulated. Note that in this example, the separate correlators would correlate the complex, descrambled data to a real Walsh code word.

Figure 8:
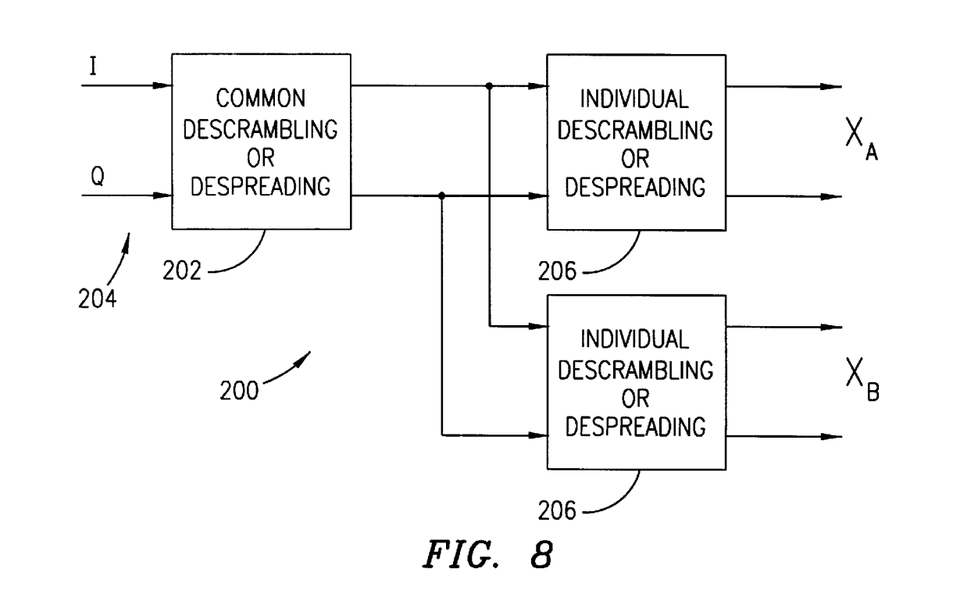
FIG. 8 is a block diagram of a second embodiment for an improved correlator of the present invention.

Reference is now made to FIG. 8 wherein there is shown a block diagram of another embodiment for an improved correlator of the present invention. When the transmitted channels share a common scrambling or spreading sequence, the receiver 200 shares a common descrambling or despreading unit 202 with respect to all of the received channels to be demodulated. Thus, complex chip samples received on line 204 for multiple channels are processed by the common descrambling or despreading unit 202 for removal of the common sequence. Next, the outputs from the common descrambling or despreading unit 202 are processed by a plurality of uncommon or individual descrambling and despreading units 206 which correlate to different sequences, providing at their outputs different correlation values for different received channels (denoted $X_A$ and $X_B$). These individual descrambling and despreading units may comprise a correlator 112' as shown in FIG. 7. The common descrambling and despreading unit may utilize the complex sequence removal units 112' and/or 112" of FIGS. 4 and 6. With respect to the foregoing IS-95 downlink example, the common sequence comprises a complex scrambling sequence, and the common descrambling or despreading unit 202 is an appropriate descrambler. For the individual descrambling and despreading units 206, a Walsh code correlator may be used to process each received channel and correlate to different sequences, thus providing different correlation values.

For example, an IS-95 based CDMA phone would have multiple RAKE fingers, each finger including a common descrambling unit and two individual descrambling and despreading units, one for the pilot channel and one for the traffic channel. When two individual despreading units are required to correlate with different Walsh codes, they can share a majority of the processing. This is because half of the bits of one Walsh code always agree with corresponding bits of the other Walsh code, while the remainder will be mutually inverted. Thus, it is advantageous for the common despreading unit 202 to compute the sum (average) over the bits that agree, and separately compute the average over the bits that differ between the two codes. An output is made of two averages per symbol period. The individual despreaders 206 then respectively compute the sum of the two averages and the difference involving a much reduced amount of computational processing.

An example will help to illustrate this reduction in processing. Suppose the two Walsh code words are:

1: 1111111100000000; and
2: 1001011001101001.

The bits in agreement are:

1_1_11_0_0_00_, and the bits in disagreement are:

_11_1_1_00_0_0, where the bit polarities of Walsh code word #1 have been used in making the comparison. In accordance with the foregoing, a first average over the eight bits in agreement is computed, inverting the sign of the value being averaged when the bit in agreement is a zero. A second average over the eight bits in disagreement is likewise computed. When these two averages are added, the resulting sixteen bit average represents correlation with the first of the two Walsh codes, as the bit polarity of the first code was used by default for the disagreeing bits. By subtracting the second average from the first, the sign of all the values contributing to the second average is effectively inverted, thus making it agree with the bits in disagreement for the second Walsh code word, which are inverted with respect to those of the first code word to obtain the result of the correlation with the second code.

Two correlations with two different Walsh codes may thus be obtained by performing one common operation (202) yielding two intermediate results per symbol period. These results are then further combined by processing at a reduced rate (⅛th for this particular example) to produce the desired two correlations. The reduction of effort applies also when many correlations with different Walsh codes are required, leading ultimately to a Fast Walsh transform structure when correlations with all Walsh codes are to be computed. U.S. Pat. No. 5,356,454 describes an efficient circuit for computing Fast Walsh Transforms, and is incorporated by reference herein.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A complex sequence removal unit for processing a received direct sequence spread spectrum communications signal having an in-phase component and a quadrature phase component, comprising:

a control unit for processing the phase of a complex spreading sequence for the received direct sequence spread spectrum communications signal to output a first and a second control sequence;

a first negation unit receiving the in-phase component of the received direct sequence spread spectrum communications signal and negating it in response to the first control sequence;

a second negation unit receiving the quadrature phase component of the received direct sequence spread spectrum communications signal and negating it in response to the first control sequence; and a switch unit receiving from the first and second negation units the in-phase and quadrature phase signals and exchanging the received in-phase and quadrature phase signals for output in response to the second control sequence.

2. The complex sequence removal unit of claim 1 wherein the first control sequence comprises an in-phase first control sequence for controlling the negation performed by the first negation unit, and a quadrature phase first control sequence for controlling the negation performed by the second negation unit.

3. The complex sequence removal unit of claim 1 wherein the switch unit has an in-phase output and a quadrature phase output and further comprises:

an in-phase switch receiving the in-phase signal and operable to connect to the in-phase output or the quadrature phase output in response to the second control sequence; and a quadrature phase switch receiving the quadrature phase signal and operable to connect to the quadrature phase output or the in-phase output in response to the second control sequence.

4. A method for processing a received direct sequence spread spectrum communications signal having an in-phase component and a quadrature phase component to effectuate complex sequence removal, comprising the steps of:

processing the phase of a complex spreading sequence for the received direct sequence spread spectrum communications signal;

negating the in-phase component of the received direct sequence spread spectrum communications signal in response to the processed phase;

negating the quadrature phase component of the received direct sequence spread spectrum communications signal in response to the processed phase; and exchanging the output in-phase and quadrature phase signals in response to the processed phase.

5. A complex sequence removal unit for processing a received direct sequence spread spectrum communications signal having an log-amplitude component and a phase component, comprising:

a phase converter for extracting a phase offset relating to a complex spreading sequence for the received direct sequence spread spectrum communications signal;

a summer for summing the phase component of the received direct sequence spread spectrum communications signal and the extracted phase offset of the complex spreading sequence to output a summed phase; and means for forming a complex signal in a logarithmic domain comprising the log-amplitude component of the received direct sequence spread spectrum communications signal and the summed phase.

6. The unit of claim 5 further including a converter for receiving and then converting the formed complex signal for output in Cartesian coordinates.

7. A method for processing a received direct sequence spread spectrum communications signal having a log-amplitude component and a phase component to effectuate complex sequence removal, comprising the steps of:

extracting a phase offset relating to a complex spreading sequence for the received direct sequence spread spectrum communications signal;

summing the phase component of the received direct sequence spread spectrum communications signal and the extracted phase offset of the complex spreading sequence to output a summed phase; and forming a complex signal in a logarithmic domain comprising the log-amplitude component of the received direct sequence spread spectrum communications signal and the summed phase.

8. The method as in claim 7 further including the step of converting the formed complex signal for output in Cartesian coordinates.

9. A correlator for processing a received direct sequence spread spectrum communications signal having a log-amplitude component and a phase component, comprising:

a phase converter for extracting a phase offset relating to a complex spreading sequence for the received direct sequence spread spectrum communications signal;

a first accumulation and dump unit for accumulating the output log-amplitude components;

a summer for summing the phase component of the received direct sequence spread spectrum communications signal and the extracted phase offset of the complex spreading sequence to output an absolute value summed phase;

a second accumulation and dump unit for accumulating and normalizing the output absolute value summed phases; and means for forming a complex signal in a logarithmic domain comprising dumped accumulated log-amplitude components relating to the received direct sequence spread spectrum communications signal and dumped accumulated summed phases.

10. The correlator as in claim 9 wherein the first accumulate and dump unit calculates an arithmetic average of the accumulated log-amplitude components.

11. The correlator as in claim 9 wherein the second accumulate and dump unit calculates an arithmetic average of the accumulated, normalized absolute value summed phases.

12. The correlator as in claim 9 further including a converter for receiving and then converting the formed complex signal for output in Cartesian coordinates.

13. A method for processing a received direct sequence spread spectrum communications signal having a log-amplitude component and a phase component, comprising the steps of:

extracting a phase offset relating to a complex spreading sequence for the received direct sequence spread spectrum communications signal;

accumulating the log-amplitude components;

summing the phase component of the received direct sequence spread spectrum communications signal and the extracted phase offset of the complex spreading sequence to output an absolute value summed phase;

accumulating and normalizing the output absolute value summed phases; and forming a complex signal in a logarithmic domain comprising the accumulated log-amplitude components relating to the received direct sequence spread spectrum communications signal and the accumulated, normalized absolute value summed phases.

14. The method as in claim 13 wherein the step of accumulating the output log-amplitude components comprises the step of calculating an arithmetic average of the accumulated log-amplitude components.

15. The method as in claim 13 wherein the step of accumulating and normalizing the output absolute value summed phases comprises the step of calculating an arithmetic average of the accumulated, normalized absolute value summed phases.

16. The method as in claim 13 further including the step of converting the complex signal for output in Cartesian coordinates.

17. A correlator for processing a received multi-channel direct sequence spread spectrum communications signal to effectuate multiple component complex sequence removal, the multiple components including a first component sequence shared by all channels of the direct sequence spread spectrum communications signal and a plurality of second component sequences unique to the multiple channels, comprising:

a common component sequence removal unit for processing the received multi-channel direct sequence spread spectrum communications signal to effectuate removal of the first component sequence; and a plurality of individual component sequence correlator units, one for each channel of interest, for processing the processed received multi-channel direct sequence spread spectrum communications signal to effectuate correlation of the second component sequences relating to the channels of interest.

18. The correlator as in claim 17 wherein the common component sequence removal unit effectuates a descrambling of the received multi-channel direct sequence spread spectrum communications signal.

19. The correlator as in claim 18 wherein each of the individual component sequence correlator units effectuates a correlation of the descrambled signal to the individual component sequence.

20. The correlator as in claim 18 wherein each of the individual component sequence correlator units effectuates a correlation of the descrambled signal to a non-complex component sequence.

21. The correlator as in claim 17 wherein said common component sequence removal unit processes a received spread spectrum communications signal having an in-phase component and a quadrature phase component and comprises:
- a control unit for processing the phase of a complex spreading sequence for the received direct sequence spread spectrum communications signal to output a first and a second control sequence;
- a first negation unit receiving the in-phase component of the received direct sequence spread spectrum communications signal and negating it in response to the first control sequence;
- a second negation unit receiving the quadrature phase component of the received direct sequence spread spectrum communications signal and negating it in response to the first control sequence; and
- a switch unit receiving from the first and second negation units the in-phase and quadrature phase signals and exchanging the received in-phase and quadrature phase signals for output in response to the second control sequence.

22. The correlator as in claim 17 wherein said common component sequence removal unit processes a received spread spectrum communications signal having an log-amplitude component and a phase component and comprises:
- a phase converter for extracting a phase offset relating to a complex spreading sequence for the received direct sequence spread spectrum communications signal;
- a summer for summing the phase component of the received direct sequence spread spectrum communications signal and the extracted phase offset of the complex spreading sequence to output a summed phase; and
- means for forming a complex signal in a logarithmic domain comprising the log-amplitude component of the received direct sequence spread spectrum communications signal and the summed phase.

23. The correlator as in claim 22 further including a converter for receiving and then converting the formed complex signal for output in Cartesian coordinates.

24. The correlator as in claim 17 wherein each of the individual component sequence removal units processes samples having a log-amplitude component and a phase component and comprises:
- a phase converter for extracting a phase offset relating to a complex spreading sequence for the received direct sequence spread spectrum communications signal;
- a first accumulation and dump unit for accumulating the output log-amplitude components;
- a summer for summing the phase component of the received direct sequence spread spectrum communications signal and the extracted phase offset of the complex spreading sequence to output an absolute value summed phase;
- a second accumulation and dump unit for accumulating and normalizing the output absolute value summed phases; and means for forming a complex signal in a logarithmic domain comprising dumped accumulated log-amplitude components relating to the received direct sequence spread spectrum communications signal and dumped accumulated summed phases.

25. The correlator as in claim 24 further including means for converting the complex signal for output in Cartesian coordinates.

26. A method for processing a received multi-channel direct sequence spread spectrum communications signal to effectuate multiple component complex sequence removal and correlation, the multiple components including a first component sequence shared by all channels of the direct sequence spread spectrum communications signal and a plurality of second component sequences unique to the multiple channels, comprising the steps of:
- processing the received multi-channel direct sequence spread spectrum communications signal to effectuate removal of the first component sequence; and
- for each channel of interest, processing the received multi-channel direct sequence spread spectrum communications signal to effectuate correlation to the second component sequences relating to the channels of interest.

27. The method as in claim 26 wherein the first step of processing further includes the step of descrambling the received multi-channel direct sequence spread spectrum communications signal.

28. The correlator as in claim 27 wherein the second step of processing further includes the step of correlating the descrambled signal to the second component sequence.

29. The method as in claim 26 wherein the second step of processing processes a received spread spectrum communications signal having an in-phase component and a quadrature phase component comprising the steps of:
- processing the phase of a complex spreading sequence for the received direct sequence spread spectrum communications signal;
- negating the in-phase component of the received direct sequence spread spectrum communications signal in response to the processed phase;
- negating the quadrature phase component of the received direct sequence spread spectrum communications signal in response to the processed phase; and
- exchanging the output in-phase and quadrature phase signals in response to the processed phase.

30. The method as in claim 26 wherein the second step of processing processes a received spread spectrum communications signal having a log-amplitude component and a phase component to effectuate complex sequence removal, comprising the steps of:
- extracting a phase offset relating to a complex spreading sequence for the received direct sequence spread spectrum communications signal;
- summing the phase component of the received direct sequence spread spectrum communications signal and the extracted phase offset of the complex spreading sequence to output a summed phase; and
- forming a complex signal in a logarithmic domain comprising the log-amplitude component of the received direct sequence spread spectrum communications signal and the summed phase.

31. The method as in claim 26 wherein the second step of processing processes a received spread spectrum communications signal having a log-amplitude component and a phase component, comprising the steps of:

extracting a phase offset relating to a complex spreading sequence for the received direct sequence spread spectrum communications signal;

accumulating the log-amplitude components;

summing the phase component of the received direct sequence spread spectrum communications signal and the extracted phase offset of the complex spreading sequence to output an absolute value summed phase;

accumulating and normalizing the output absolute value summed phases; and forming a complex signal in a logarithmic domain comprising the accumulated log-amplitude components relating to the received direct sequence spread spectrum communications signal and the accumulated, normalized absolute value summed phases.

32. A correlator for processing a received direct sequence spread spectrum communications signal having a log-amplitude component and a phase component, comprising:

a phase converter for extracting a phase offset relating to a complex spreading sequence for the received direct sequence spread spectrum communications signal;

a first accumulation and dump unit for accumulating the output log-amplitude components;

a summer for summing the phase component of the received direct sequence spread spectrum communications signal and the extracted phase offset of the complex spreading sequence to output a summed phase;

means for circularly averaging the output summed phases to output accumulated phases; and means for forming a complex signal in a logarithmic domain comprising dumped accumulated log-amplitude components relating to the received direct sequence spread spectrum communications signal and accumulated summed phases.

33. The correlator as in claim 32 wherein the first accumulate and dump unit calculates an arithmetic average of the accumulated log-amplitude components.

34. The correlator as in claim 32 wherein the means for circularly averaging comprises:

a sine/cosine converter for converting the output summed phases to sine and cosine values; and a second accumulate and dump unit for accumulating the sine and cosine values, and calculating an arithmetic average of the accumulated sine and cosine values to output accumulated phases.

35. The correlator as in claim 32 further including means for converting that complex signal for output in Cartesian coordinates.

36. A method for processing a received direct sequence spread spectrum communications signal having a log-amplitude component and a phase component, comprising the steps of:

extracting a phase offset relating to a complex spreading sequence for the received direct sequence spread spectrum communications signal;

accumulating the log-amplitude components;

summing the phase component of the received direct sequence spread spectrum communications signal and the extracted phase offset of the complex spreading sequence to output an absolute value summed phase;

circularly averaging the output summed phases to output accumulated phases; and forming a complex signal in a logarithmic domain comprising the accumulated log-amplitude components relating to the received direct sequence spread spectrum communications signal and the accumulated phases.

37. The method as in claim 36 wherein the step of accumulating the output log-amplitude components comprises the step of calculating an arithmetic average of the accumulated log-amplitude components.

38. The method as in claim 36 wherein the step of circularly averaging comprises the steps of:

performing a sine/cosine conversion on the output summed phases to generate sine and cosine values; and calculating an arithmetic average of the accumulated sine and cosine values to output accumulated phases.

39. The method as in claim 36 further including the step of converting the complex signal for output in Cartesian coordinates.

* * * * *

UNITED STATES PATENT AND TRADEMARK OFFICE
CERTIFICATE OF CORRECTION

PATENT NO.    : 6,005,887
DATED         : December 21, 1999
INVENTOR(S)   : Bottomley et al.

It is certified that error appears in the above-identified patent and that said Letters Patent is hereby corrected as shown below:

<u>Title page,</u>
Item [73], change assignee name to -- Ericsson Inc. --

Signed and Sealed this

First Day of April, 2003

JAMES E. ROGAN
*Director of the United States Patent and Trademark Office*